Figure 1:
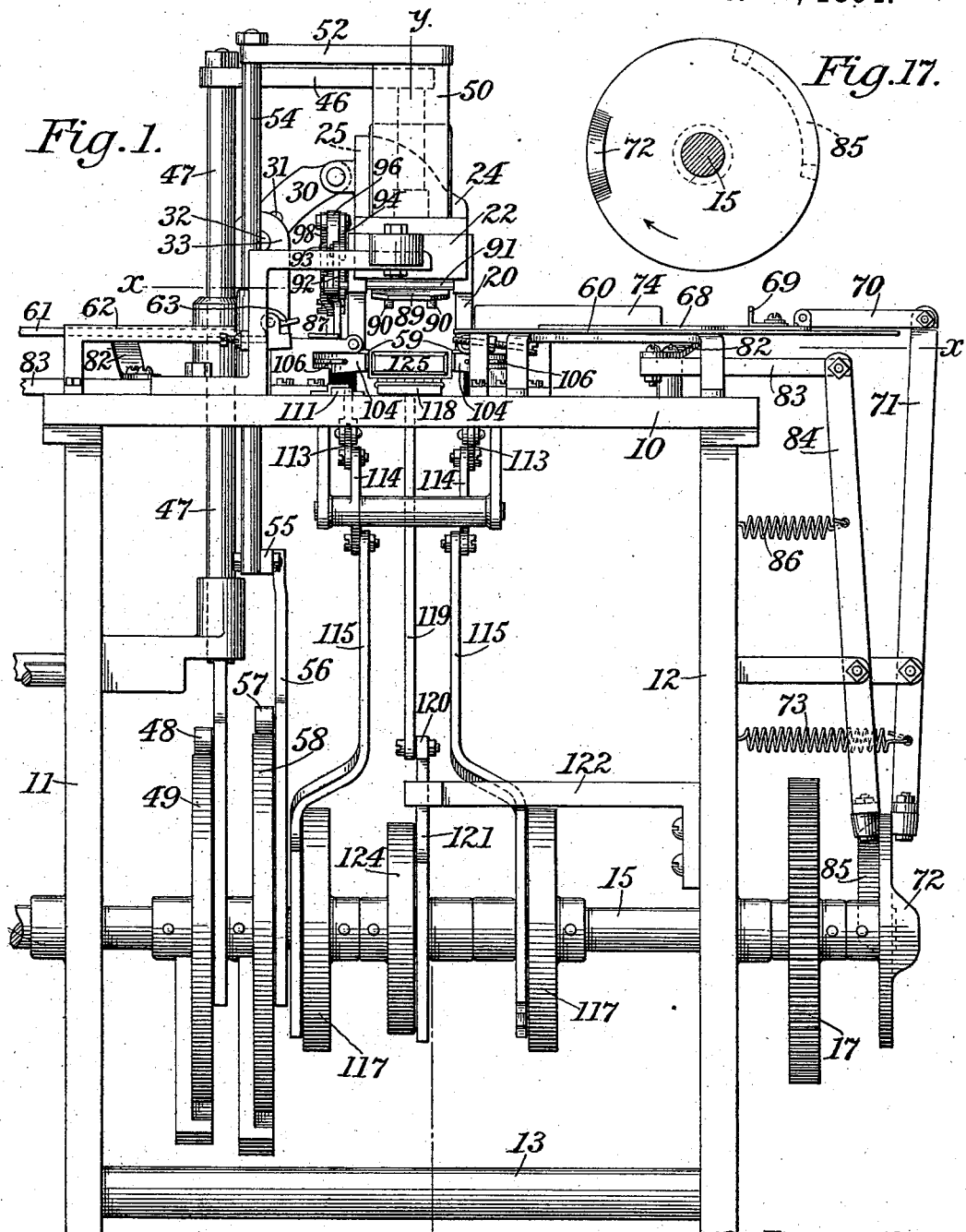

(No Model.)

7 Sheets—Sheet 2.

J. S. VOITEK.
PACKAGING MACHINE.

No. 531,073.

Patented Dec. 18, 1894.

Attest:
A. N. Jesbera
A. Kidder

Inventor:
John S. Voitek
by William B. Greeley
Atty.

(No Model.)  J. S. VOITEK.  7 Sheets—Sheet 3.
PACKAGING MACHINE.
No. 531,073.  Patented Dec. 18, 1894.

Attest:
A. N. Jesbera
A. Skidder

Inventor:
John S. Voitek
by William B. Greeley
Atty.

(No Model.)

7 Sheets—Sheet 4.

J. S. VOITEK.
PACKAGING MACHINE.

No. 531,073.

Patented Dec. 18, 1894.

Attest:
A. N. Jesbera
A. Hidder

Inventor:
John S. Voitek
by William B. Greeley
Att'y.

(No Model.) 7 Sheets—Sheet 5.
J. S. VOITEK.
PACKAGING MACHINE.
No. 531,073. Patented Dec. 18, 1894.
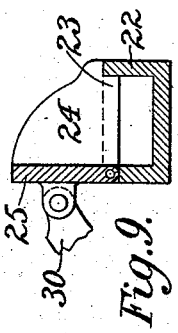
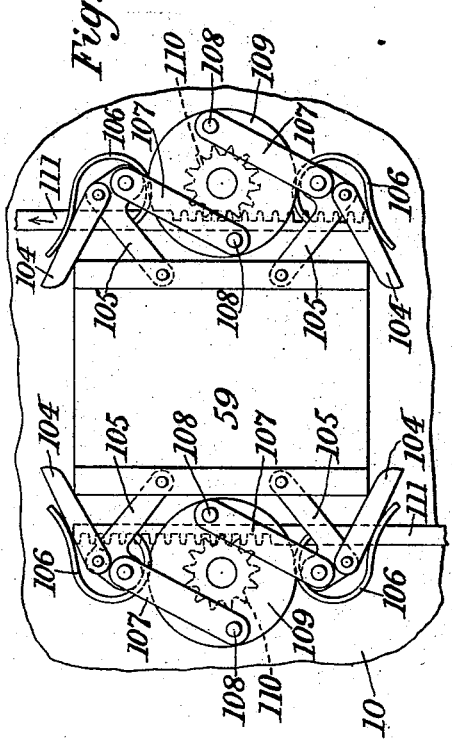
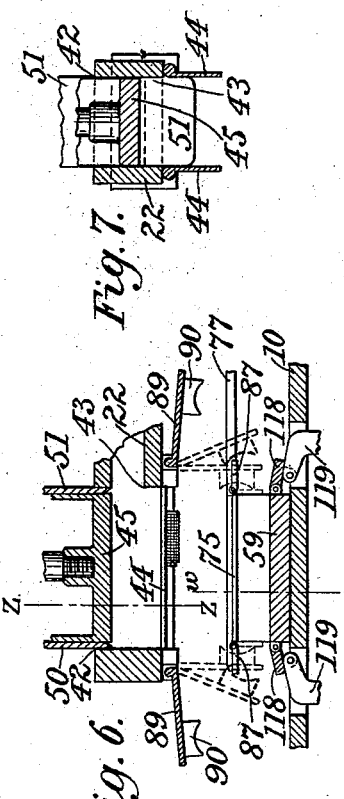
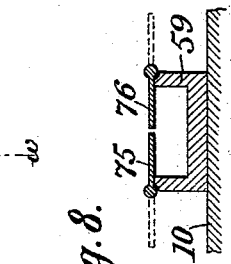
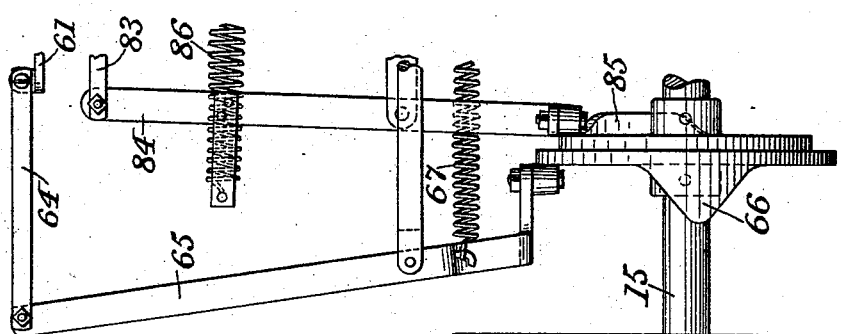
Attest:
A. N. Jesbera
A. Thdder
Inventor:
John S. Voitek
by William B. Greely
Atty.

(No Model.) 7 Sheets—Sheet 6.
J. S. VOITEK.
PACKAGING MACHINE.
No. 531,073. Patented Dec. 18, 1894.
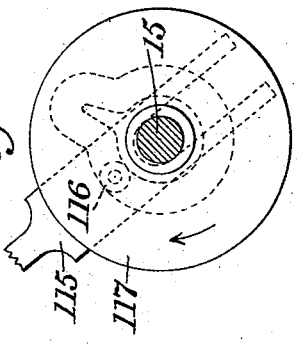
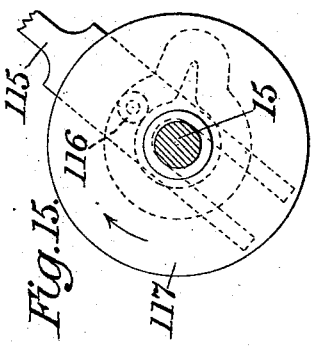
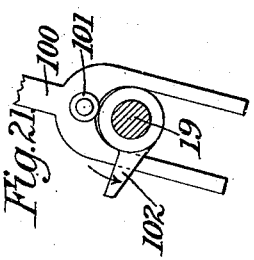
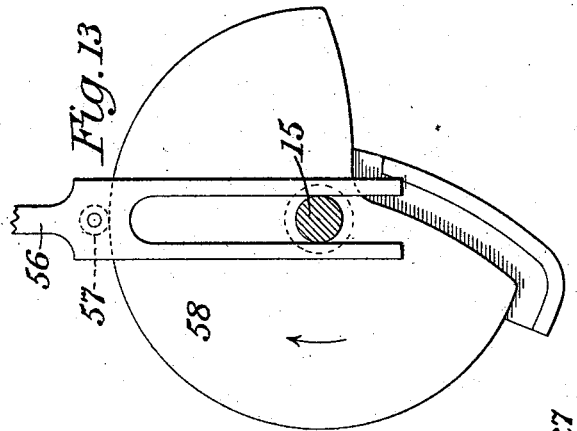
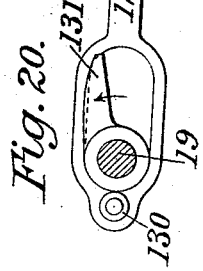
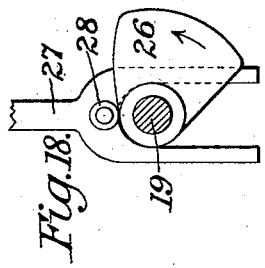
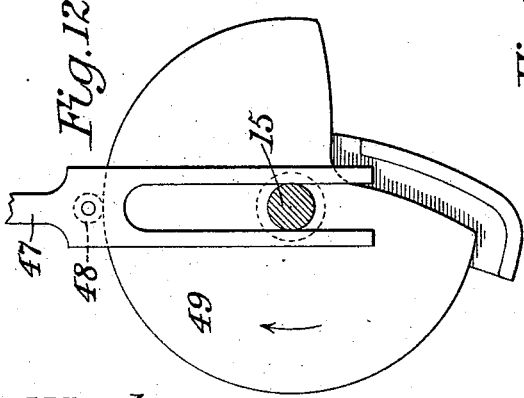
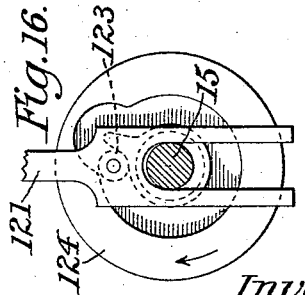
Attest:
A. N. Jesbera
A. Kidder
Inventor:
John S. Voitek
by William B. Greeley
Atty.

(No Model.) 7 Sheets—Sheet 7.

J. S. VOITEK.
PACKAGING MACHINE.

No. 531,073. Patented Dec. 18, 1894.

Attest:
A. N. Jesbera
A. Kidder

Inventor:
John S. Voitek
by William B. Greeler
Att'y.

UNITED STATES PATENT OFFICE.

JOHN S. VOITEK, OF NEW YORK, N. Y.

PACKAGING-MACHINE.

SPECIFICATION forming part of Letters Patent No. 531,073, dated December 18, 1894.

Application filed February 19, 1894. Serial No. 500,629. (No model.)

*To all whom it may concern:*

Be it known that I, JOHN S. VOITEK, of the city, county, and State of New York, have invented certain new and useful Improvements in Packaging-Machines; and I do hereby declare that the following is a full and exact description thereof, reference being had to the accompanying drawings, and to the figures of reference marked thereon, making a part of this specification.

In Letters Patent of the United States, granted to me January 30, 1894, and numbered 513,692, I have shown and described a machine which is especially adapted for forming cakes of tobacco or other loose material and inclosing them in a wrapper. Practical trials of a machine constructed in accordance with said patent show that in operation it is on the whole satisfactory, particularly when compared with the methods and mechanism heretofore in use for effecting similar results. Such trials, however, have also shown wherein the former machine was capable of improvement and it has accordingly been the object of my present invention to improve the construction and operation of the former machine in various particulars which will be referred to hereinafter more at length. It will be understood, of course, that as various portions of the former machine were capable of use independently of other portions, so also certain parts of the improved machine may of themselves effect certain desirable results whether the remaining parts are employed with them or not, although the several parts are herein shown and described as combined in a single complete machine and as co operating to produce a unitary result.

The improved machine, like the former machine, is adapted to form a cake of tobacco or other similar material which is fed to the machine by an attendant, to wrap the cake in a sheet of any desired material, such as tin-foil or paper, folding the projecting ends of the wrapper down upon the cake quite as neatly as it could be done by an expert operator working with the hands alone, and finally to eject the package from the machine. In its general arrangement the new machine is also similar to the old machine but in certain details of construction and arrangement it differs considerably. Instead of relying upon feed-rolls to deliver the material to the compressing mechanism, which proved to be somewhat uncertain in their action when used with some substances, the present machine receives from the hand of the operator or from any suitable mechanical device in place thereof, a measured quantity of the loose material which is forthwith compacted to a limited extent and is then delivered to the cake-forming mechanism, whereby absolute uniformity in the size and weight of the packages is secured and the action of the machine is made more certain. As in the former machine the tobacco is fed forward through a tube or chute from which it is forced by a plunger into an open box across which the wrapper is laid before the cake passes into it; but whereas in such machine there was more or less opportunity for the tobacco to expand somewhat between the feeding chute and the box, provision is now made whereby such expansion is wholly prevented thereby preventing also the waste of material and the littering of the machine. The devices for folding in the various parts of the wrapper have also been materially improved so that their action becomes more certain and the possibility of tearing the wrapper or of producing an imperfect fold is greatly reduced. The operating mechanism of the machine has also been rearranged partly because such rearrangement is necessitated by the changes above referred to and partly because it improves the action of the machine and makes its construction somewhat easier.

Other features of improvement will be referred to hereinafter.

Figure 2:
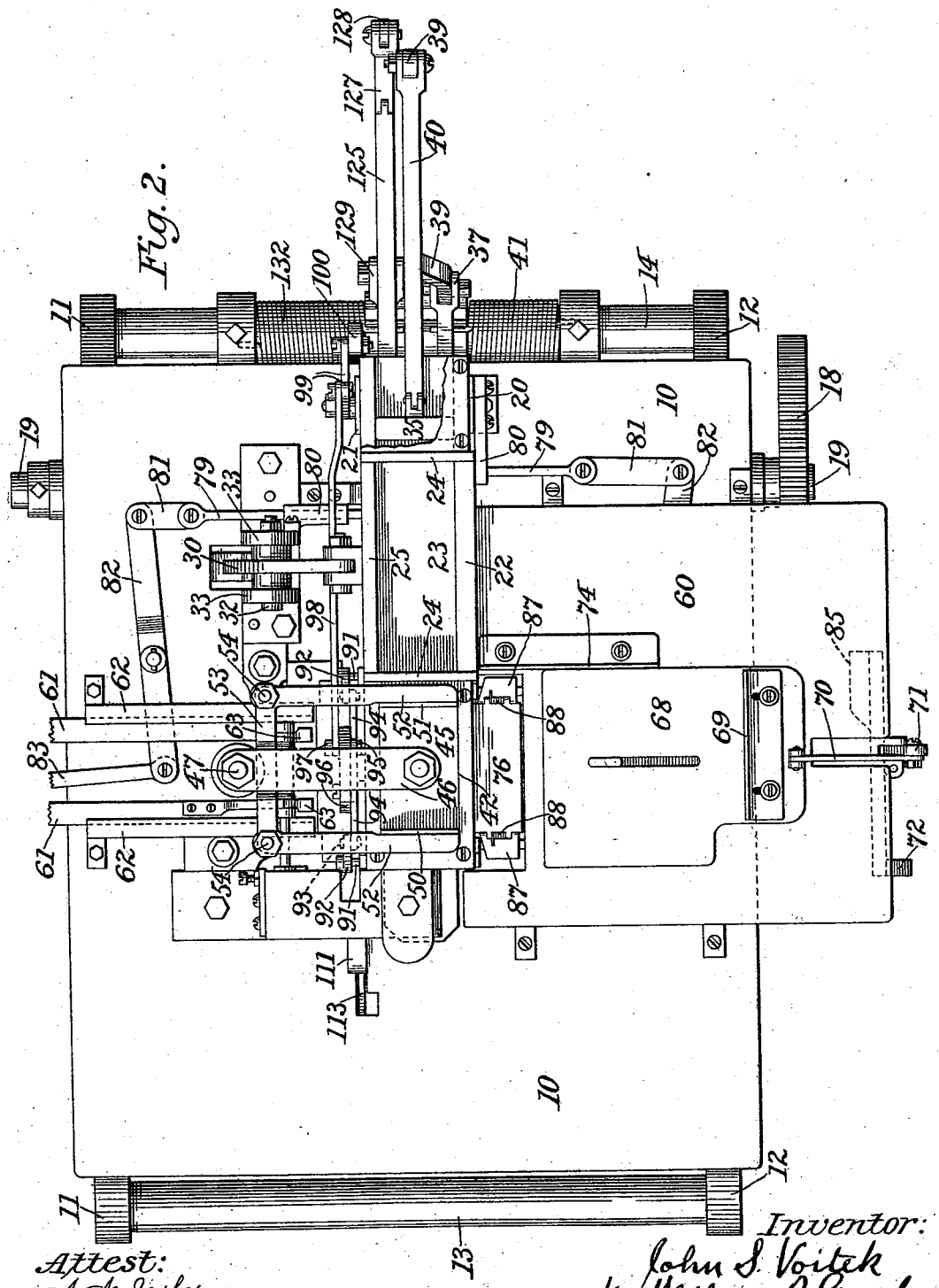
Figure 3:
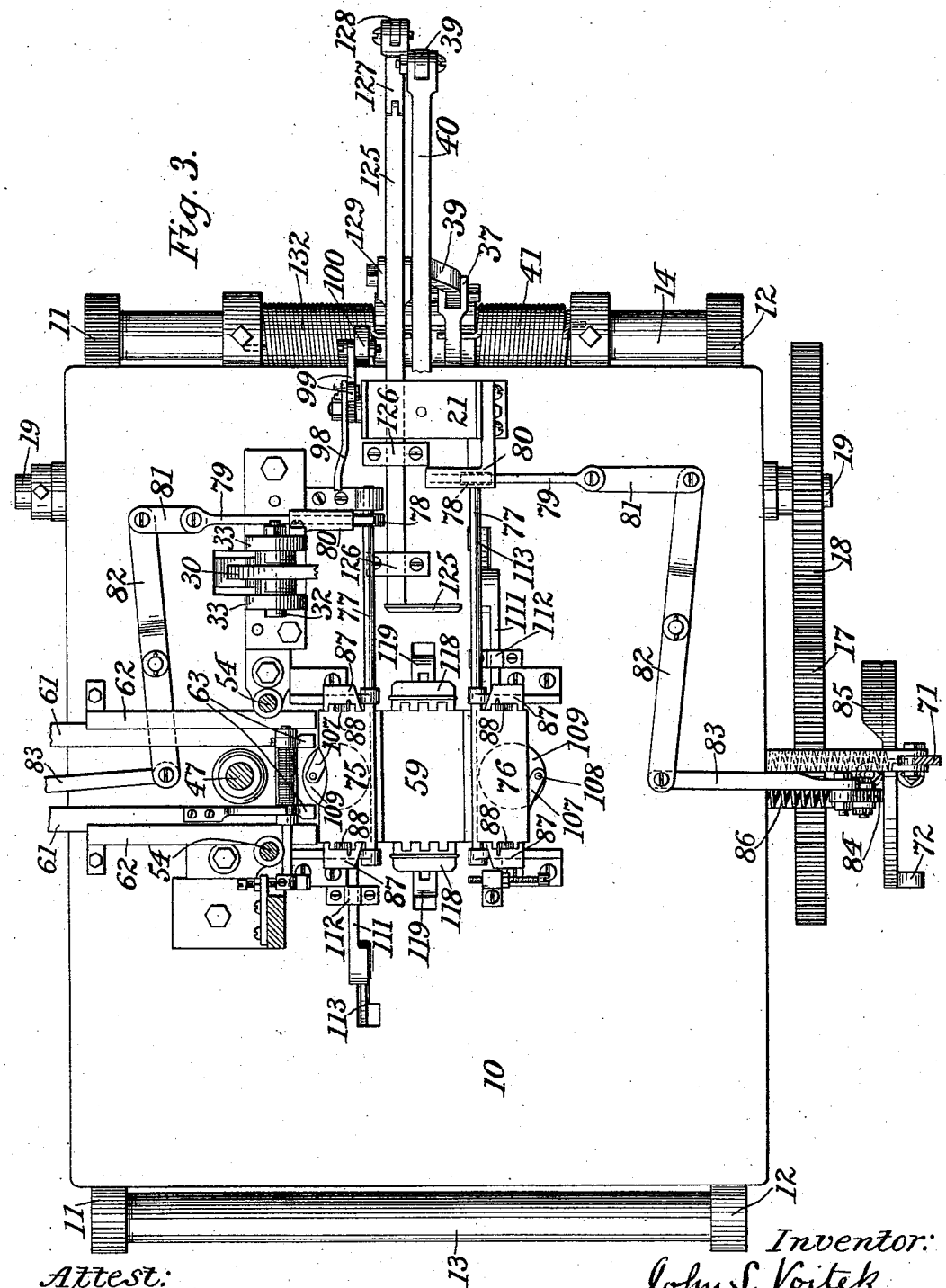
Figures 4, 11:
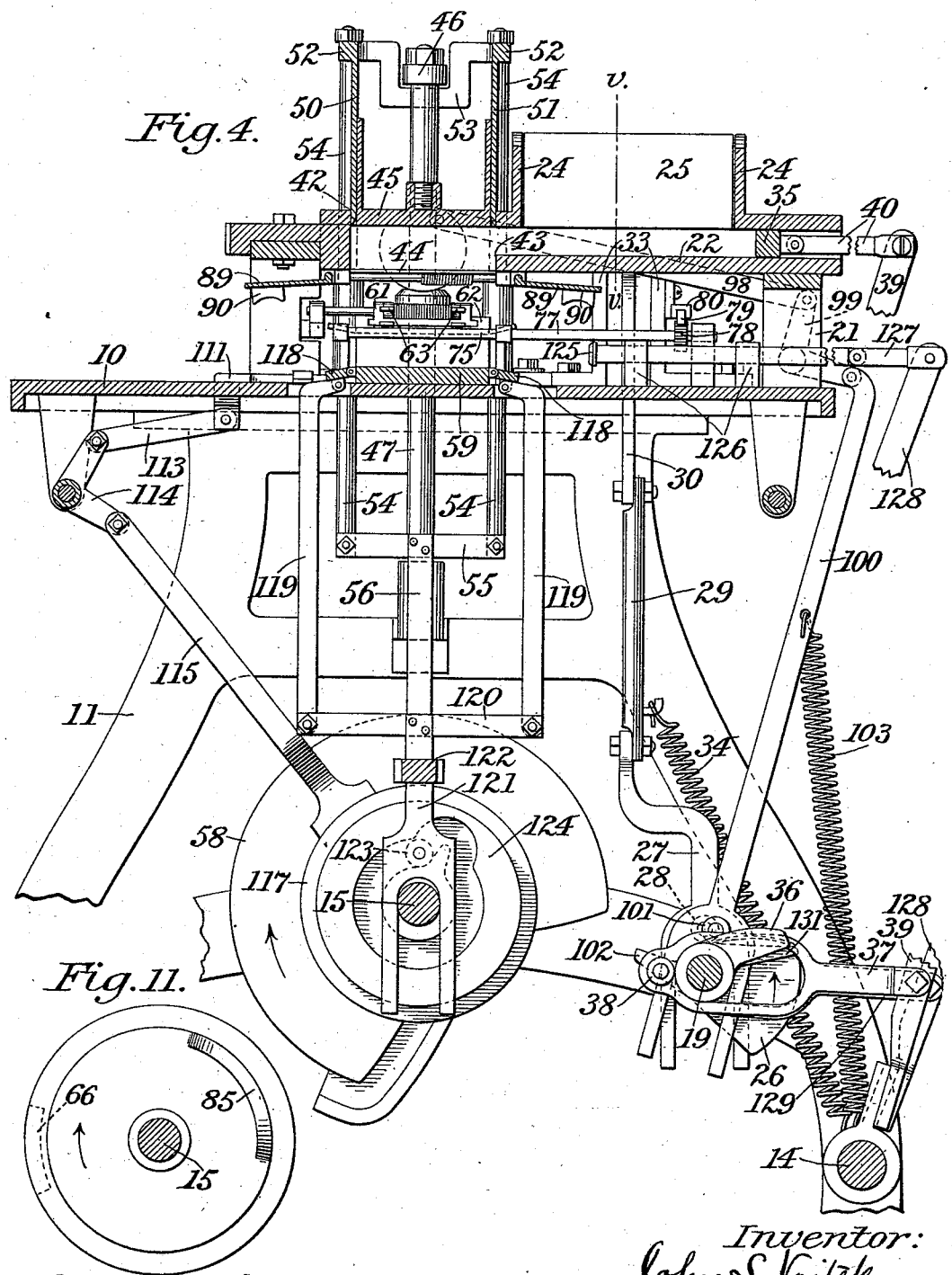
Figure 22:
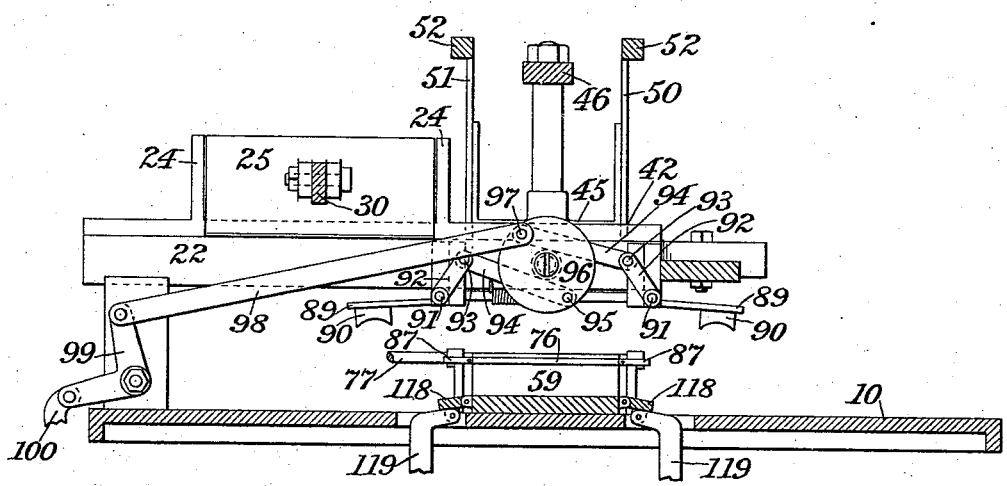

In the accompanying drawings: Figure 1 is an elevation of the delivery end of the machine, with a portion of the actuating mechanism broken away. Fig. 2 is a plan of so much of the machine as is shown in Fig. 1. Fig. 3 is a plan view of the machine similar to Fig. 2 but with the parts above the line $x-x$ of Fig. 1 removed. Fig. 4 is a vertical longitudinal section of the machine on the line $y-y$ of Fig. 1. Fig. 5 is an elevation of that part of the actuating mechanism omitted from Fig. 1. Fig. 6 is a detail section on the plane of Fig. 4 illustrating the operation of some of the parts. Fig. 7 is a detail cross section on the line z—z of Fig. 6, but showing the parts in a different position. Fig. 8 is a detail cross section on the line w—w of Fig. 6. Fig. 9 is a detail section on the line v—v of Fig. 4. Fig. 10 is a detail plan view of the mechanism for operating the end folding wings. Figs. 11, 12, 13, 14, 15, 16 and 17 are detail side elevations of certain of the actuating cams showing also portions of their connections. Figs. 18, 19, 20 and 21 are detail side elevations of certain other cams showing also portions of their connections. Fig. 22 is a detail view in side elevation to show a portion of the wrapper folding mechanism, the direction of sight being opposite to that of Fig. 4.

As represented in Figs. 1, 2, 3 and 4 of the drawings the frame-work upon which the mechanism is supported comprises a bedplate 10, side-frames or standards 11, 12, and suitable tie-rods 13, 14. In suitable bearings, supported by the standards 11, 12, is journaled a primary shaft 15 which receives at one end the driving pulley 16 and has secured to it the several cams, more particularly referred to hereinafter, which are mainly concerned with the compressing of the material and with the inclosing of the same in a wrapper. A gear 17 is also fixed to the shaft 15 and meshes with and drives the gear 18 which is secured to a secondary shaft 19. The latter is mounted in suitable bearings in the side frames parallel with the shaft 15 and carries cams which have to do chiefly with the preliminary compacting of the material, the feeding of the same forward for compression, and the ejection of the completed package. The several instrumentalities which directly effect the compacting, feeding, compressing, wrapping and the final ejection of the completed package are wholly above the bed-plate 10 and are connected with the actuating mechanism by suitable intermediate devices as hereinafter described. These several instrumentalities and their connections will now be described in their order.

Upon suitable standards 20, 21, erected upon the bed-plate 10, is supported a feeding chute 22 which is hereinafter referred to as the feed-tube, although it is open on one side or the other for the greater portion of its length. At a suitable distance from its head the tube 22 is provided with a lateral opening 23, which, in the machine represented, is formed through the top of the tube. At each end of the opening 23 are erected guards 24 (see Figs. 2, 4 and 9) and in proximity to the opening is movably supported a door or cover 25. The door or cover is preferably hinged, as represented and the guards and the cover, when the latter is opened, form a receiving mouth into which the tobacco or other material to form a cake may be thrown and by which it is directed into the feed-tube. The cover is closed at stated intervals to compact the material beneath it in order that such material may be delivered to the final compressing mechanism in the best condition for its action. The means for actuating the cover are shown in Figs. 1, 2, 3, 4, 9 and 18, and comprise a cam 26 on the shaft 19, a rod 27 having a roller 28 which rests upon the periphery of said cam and is forked to straddle the shaft, a link 29, and an arm 30 which is pivotally connected to the cover 25 and is slotted, as at 31, to slide and turn on a pin 32 which is carried by brackets 33. A spring 34 may be attached at one end to a fixed point and at the other end to some part of the connections just referred to for the purpose of holding the roller always in contact with the periphery of the cam 26.

As soon as the material has been compacted by the closing of the door 25 and while the door remains in its new position the means for feeding the loosely compacted material forward to the position where it is acted upon by the compressing mechanism begin to operate. These means are shown clearly in Figs. 2, 4 and 19 and comprise a feed plunger 35 which is adapted to slide freely to and fro in the feed-tube 22 and is actuated by a cam 36 on the shaft 19, an arm 37 slotted to straddle said shaft and having a roller 38 to rest upon the periphery of the cam 36, a lever 39 which is pivoted upon a tie-rod 14, to which the rod 37 is connected, and a link 40 between the free end of the lever and the feed plunger 35. A spring 41 acts upon the lever 39 to withdraw the plunger 35 swiftly as soon as the cam 36 passes beyond the roller 38.

As in the machine shown in the patent above referred to, the feed-tube 22 is provided with oppositely disposed apertures, as at 42, 43, (see Figs. 2, 4, 6 and 7) through which the compressing plunger is adapted to move, carrying the material before it into the open box in which the final compression takes place, the opening 43 toward which the plunger moves being closed temporarily by spring-pressed doors 44 which prevent the material from falling loosely into the box below it but which yield readily when the material is thrust down by the plunger. Likewise the compressing plunger 45 is operated in the same manner as the plunger in said former machine, being carried by an arm 46 which is fixed to a rod 47, the latter being formed at its lower end to straddle the shaft 15 and having a roller 48 to bear upon a cam 49 (see Figs. 1 and 12) fixed to the shaft 15. In said former machine I affixed guard plates to the plunger in order to keep the feed-tube closed during the action of the plunger. These guard plates moved with the plunger and consequently had no other function than that referred to. In the present machine I make the guard plates 50, 51, independent of the plunger 45 and affix them to arms 52 which are carried by a cross-bar 53. The latter is fixed to rods 54 which move vertically in suitable bearings supported by the bed-plate and below the bed-plate are fixed to a cross-head 55 which in turn is fixed to a bar 56, slotted to straddle the shaft 15 and having a roller 57 to rest upon the periphery of a cam 58 (see Fig. 13) fixed to said shaft 15. The cam 58 is so shaped and arranged with reference to the cam 49 that the guard plates 50, 51 move slightly in advance of the plunger and therefore prevent the longitudinal expansion of the newly formed cake of material. The doors 44 are opened by the descent of the guard plates 50, 51, and prevent the lateral expansion of said cake, which is thus inclosed on all sides during its descent, whereby the waste or scattering of the material upon the machine is entirely prevented. The guard plate 50 also keeps the feed-tube closed during the descent of the plunger and prevents any material from escaping therefrom. The guard plates move up simultaneously with the plunger 45 and the doors 44 close in readiness for the reception of more material.

A box or mold 59 (see Figs. 1, 3, 4, 6, 8 and 10) having an open top and open ends is supported on the bed-plate 10 in position to receive the material from the plunger 45 for compression thereby, as in my said former machine. Before the plunger descends, carrying with it the material from the feed-tube, the wrapper which is to inclose the cake is laid across the top of the box and is carried down into the same by the descent of the material with the plunger. The wrapper is laid upon a table 60 (see Figs. 1 and 2) with its edge in proximity to the box 59 and at the proper time is laid across the box by a carriage 61 which is mounted to reciprocate in ways 62, 62. (See Figs. 1, 2 and 3.) The carriage is provided with nipping fingers 63 which close upon the edge of the wrapper as the carriage reaches the limit of its forward movement and retain their hold as the cariage retires, thereby drawing the wrapper with the carriage until the limit of the rearward movement is reached, when the fingers release the wrapper. The carriage frame is connected by a link 64 to a lever 65 (see Fig. 5) which is actuated to reciprocate the carriage by a cam 66 on the shaft 15 and a spring 67. The mechanism for placing the wrapper is substantially the same as that shown in my said patent and need not be further described herein. In my said former machine I left it to the attendant to place each wrapper in position to be grasped by the fingers of the carriage but I have found that when the machine is worked to its full speed the attendant does not always lay the wrapper in the proper position. Therefore I mount a slide 68 (see Figs. 1 and 2) on the table 60 upon which is secured a lip 69. The slide is connected by a link 70 to the upper end of a lever 71 which is actuated at the proper time by a cam 72 on the shaft 15 to thrust forward into the grip of the fingers the wrapper which has been laid upon it, the slide and lever being returned to normal position by a spring 73. The lip 69 and the guide 74 make it possible for the attendant to lay the wrapper in proper position upon the slide even when working very rapidly and the slide will then bring the wrapper into the exact position in which it should be placed in order that it may be seized by the fingers 63. As soon as the wrapper has been laid across the box the plunger descends, carrying the partly compacted cake before it and compressing it in the box 59, and immediately rises out of the way to permit the upstanding sides of the wrapper and the projecting ends to be folded snugly upon the package.

The several devices which are concerned in the folding of the wrapper operate substantially in the same manner as those shown in my said patent but they have been so improved as to make their operation more reliable, to make the folds more neatly and to reduce the danger of tearing or breaking the wrapper. The improved folding mechanism will now be described.

The leaves 75, 76, (see Figs. 2, 3 and 8) which fold down the upstanding sides of the wrapper instead of sliding over the box as before, whereby the wrappers were sometimes torn, are arranged to turn and for this purpose are hinged in proximity to the sides of the box 59, or, it may be, are hinged to the sides themselves as indicated in Fig. 8. Normally they lie back in the horizontal plane to permit the wrapper to be laid over them and they are turned over at the proper time by the following devices: each leaf 75 or 76 is fixed to a corresponding spindle 77, which bears at its end a pinion 78 in mesh with a corresponding rack-bar 79. Each rack-bar slides through a suitable guide 80 and is connected by a link 81 to one end of a corresponding horizontal lever 82, which is pivoted on the bed-plate 10 and has its other end connected by a link 83 to a vertical lever 84, which is operated in one direction to turn the leaf over by one of two cams 85 (see Figs. 1, 3 and 5) on the shaft 15 and in the other direction to restore the leaf to its normal position by a spring 86.

As shown in Fig. 8, the two leaves 75 and 76 do not meet in the middle and one of the cams 85 is so set as to operate its leaf slightly in advance of the other, thereby insuring the laying down of one side of the wrapper smoothly with the other on top of it. Each leaf 75 or 76 has hinged at each end thereof a wing 87 (Figs. 2, 3 and 6) which projects beyond the end of the box. These wings are intended to fold down the projecting ends of the wrapper and, being hinged in close proximity to the line of the fold, are much less likely to crumple the end than the device before used for the purpose. Each wing 87 is held normally in the same plane as its leaf by a spring 88 and is depressed by an arm 89 (Figs. 4 and 6) which is hinged to the under side of the feed-tube above and preferably bears a cam block 90 at its end to effect the desired movement of the wing. The two wings at the same end of the box are preferably operated by a single arm 89 and each arm is carried by a spindle 91 (Figs. 1, 2 and 22) which has fixed to its end a crank arm 92 having a crank pin 93. The latter is connected by a link 94 to an eccentric pin 95 carried by a disk 96 which is mounted to rotate on a stud fixed on the side of the tube 22. Another pin 97 on the disk is connected by a link 98 (Fig. 22) to one arm of an elbow lever 99 (Fig. 4), the other arm of which is connected to a bar 100. The bar 100 is forked at the lower end to straddle the shaft 19 and has a roller 101 which bears upon a cam 102 (Fig. 21) on the shaft 19, a spring 103 serving to return the parts to normal position after the action of the cam.

In the former machine the wings for folding the projecting ends of the wrapper in from the sides were pivoted at the corners of the box and moved, not bodily, but upon a fixed axis. It has been found that the wings so supported do not effect a smooth fold of the wrapper and in order to overcome this difficulty I mount and operate the corresponding wings of the new machine, which are numbered 104, in such a manner that they may move bodily, imitating closely the movement of the hand in folding in the end of a wrapper. Each wing is preferably hinged or pivoted to an arm 105 (as shown in Fig. 10) which in turn is pivoted to the side of the box 59 or to any other convenient fixed point. A spring 106 affixed to the arm 105, presses the wing always toward the box and a link 107 connects the arm 105 to an eccentric pin 108 on a disk 109 which is partially rotated at the proper time to swing the arm 105 to cause the wing 104 to move across the end of the box and to fold in the projecting end of the wrapper. The disk has fixed thereto a pinion 110 which is engaged by a rack-bar 111 sliding in suitable guides 112 on the bed-plate and connected by a link 113 (see Figs. 3 and 4) to one arm of a bell-crank lever 114, the other arm of which is connected to a rod 115. The lever is forked at its lower end to straddle the shaft 15 and has a roller 116 which enters the groove of a cam 117 (Figs. 14 and 15) mounted on said shaft 15. The two cams 117 are duplicates but are differently disposed upon the shaft 15, as required by convenience in the arrangement of the two disks 109 and the devices intermediate said disks and the corresponding cams, and the action is preferably so timed as to effect the infolding of the ends after the upstanding sides of the wrapper have been folded down by the leaves 75 and 76, and after the projecting ends have been folded down by the wings 87. The turning up of the projecting ends of the bottom of the wrapper is effected in the same manner as in said former machine, by leaves 118 (see Figs. 3, 4 and 6) which are hinged at the ends of the bottom of the box 59 and are actuated at the proper time by rods 119 which are pivoted to a crosshead 120, the latter is secured to a bar 121 which slides in a suitable guide-piece 122, is forked at its lower end to straddle the shaft 15 and has a roller 123 to enter the groove of a cam 124 (Fig. 16) fixed on the shaft 15.

The final operation of the machine is the ejection of the completed package. This is accomplished by an ejector 125 (see Figs. 1, 3 and 4) which is mounted in suitable guides 126 to reciprocate in line with the box 59 and is connected by a link 127 to the other end of a lever 128 which is mounted on a tie-rod 14 and is actuated at the proper time by a bar 129 which is slotted to embrace the shaft 19 and has a roller 130 to bear upon the cam 131 (Fig. 20) fixed on said shaft 19. A spring 132 withdraws the ejector immediately after the action of the cam 131.

The various parts of the machine are so arranged and related that the entire series of operations described above takes place during a single complete rotation of the shaft 15 and the order of such operations is substantially as follows: A measured quantity of the material to be packed having been thrown into the feed tube 22 through the receiving mouth formed by the guards 24 and the open cover 25, the cover is depressed to effect a preliminary compacting of the material in the tube. The plunger 35 then immediately acts to thrust the partially compacted material from beneath the cover into the farther end of the tube where the material then rests upon the doors 44 in the path of the plunger 45. The plunger 35 withdraws instantly after effecting the transfer of the material and the guards 50, 51 descend, followed immediately by the plunger 45 which effects the final compression of the material in the open box. The plunger 45 and the guards 50, 51, begin to rise immediately after they have reached the limit of their downward movement and as soon as they have risen sufficiently the leaves 75 and 76 are moved to turn down the upstanding sides of the wrapper. While the leaves are in their new position the wings 87 are operated by the arms 89 to turn down the projecting ends from the top and are at once released. Next the wings 104 are operated to turn in the projecting ends of the wrapper from the sides and immediately retire and thereafter the leaves 118 operate to turn the projecting ends of the wrapper up from the bottom. As soon as the leaves 75 and 76 and the leaves 118 have moved back to their normal positions the ejector 125 throws out the completed package.

The machine which is shown in the drawings is especially adapted for the packaging of tobacco and it will be readily understood that various modifications may be required in the form and arrangement of the various parts of the mechanism according to the nature of the material operated upon and the character of the work to be performed. Such alterations will readily suggest themselves and need not be described at length herein.

I claim as my invention—

1. The combination of a tube having an opening in its side through which the material to be operated upon may be introduced, guards at the ends of said opening above the top of the tube, a cover for said opening hinged at one side thereof, to swing between said guards, whereby a hopper is formed to receive the loose material when the cover is turned back, a cam and intermediate means for operating said cover to compact the material within the tube, and means to expel the compacted material from said tube, substantially as shown and described.

2. The combination of a tube having an opening in its side through which the material to be operated upon may be introduced, means operating through said opening to compact the material placed within the tube, means to force the material from beneath said compacting device and from said tube, an open box to receive the partly compacted material from said tube, means to lay a wrapper across said box between it and the tube and a plunger and means to operate the same to finally compress the material in said box, substantially as shown and described.

3. The combination of a feed-tube, a plunger working transversely through said tube, an open box to receive the material from said tube, independent guard plates adjacent to the plunger on opposite ends thereof and parallel therewith, and means to move said guard plates in advance of the plunger, substantially as shown and described.

4. The combination of a feed-tube, a plunger working transversely through said tube, an open box to receive the material from said tube, yielding doors hinged at opposite sides of the opening in the tube toward which the plunger moves, independent guard plates adjacent to the plunger on opposite ends thereof and parallel therewith, and means to move said guard plates in advance of the plunger, substantially as shown and described.

5. The combination of an open box adapted to receive the material to be wrapped and a wrapper therefor, leaves hinged in proximity to the sides of said box, means to move said leaves to fold the sides of the wrapper down upon the cake, wings hinged to the ends of said leaves, arms supported above said box and means to depress said arms to push said wings down to fold down the projecting ends of the wrapper while the leaves are in position over the cake, substantially as shown and described.

6. The combination of an open box adapted to receive the material to be wrapped and a wrapper therefor, arms pivoted in proximity to the corners of said box, wings pivoted upon the ends of said arms, springs pressing said wings toward the box and means to operate said arms to cause the wings to fold in the projecting ends of the wrapper.

7. The combination of an open box, a plunger, means to operate the same to compress the material in the box, a reciprocating carriage having fingers to grasp a wrapper and lay it across the box, a slide having a lip against which a wrapper may be placed, and means to move said slide for the purpose of placing the wrapper in position to be grasped by said carriage, substantially as shown and described.

In testimony whereof I have signed my name to this specification in the presence of two subscribing witnesses.

JOHN S. VOITEK.

Witnesses:
W. B. GREELEY,
A. WIDDER.